July 12, 1932.  E. R. EVANS  1,866,884
BRAKE
Filed Sept. 14, 1925   2 Sheets-Sheet 1
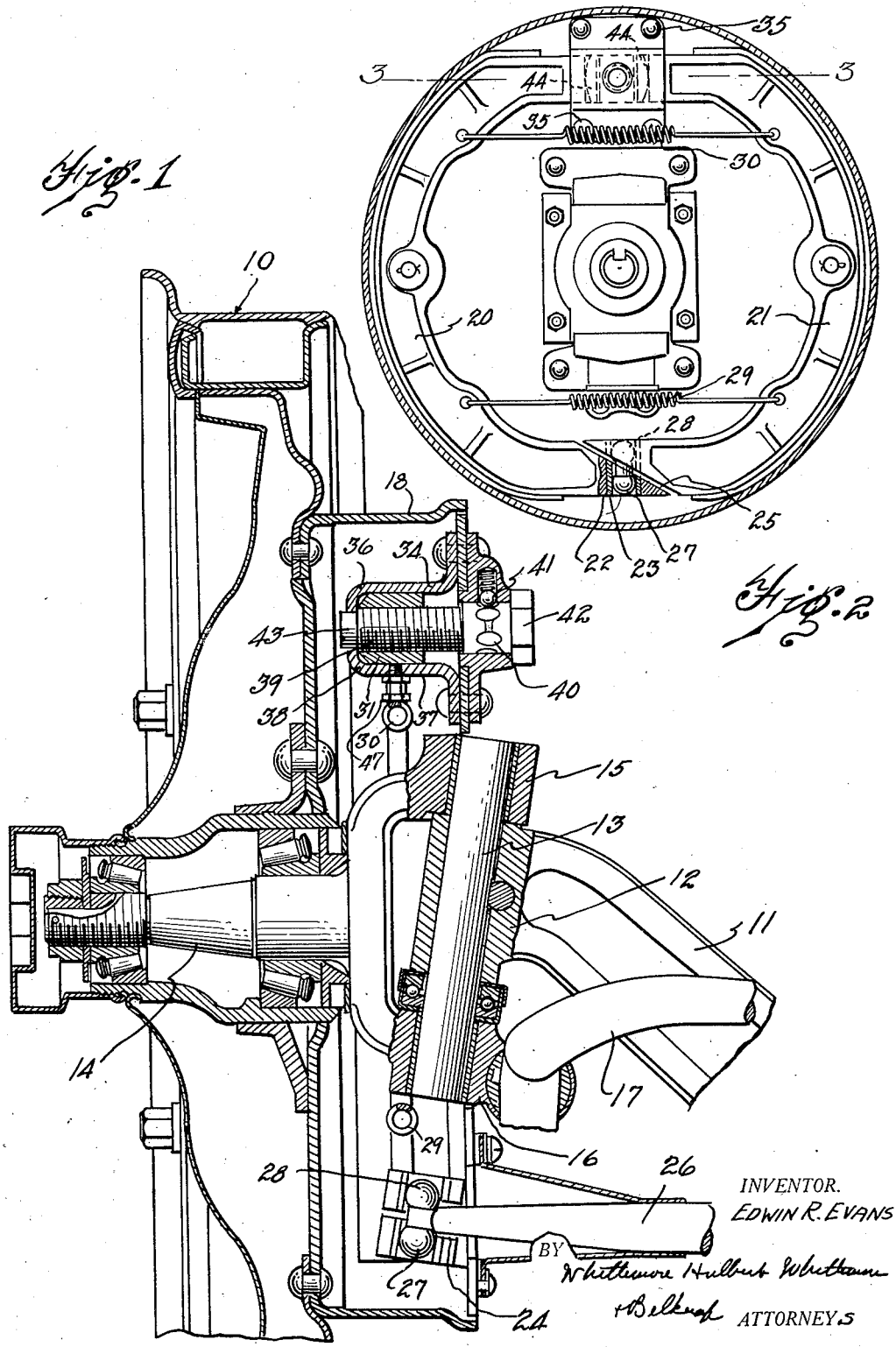
INVENTOR.
EDWIN R. EVANS
BY
Whittemore Hulbert Whittemore
+Belknap ATTORNEYS July 12, 1932.  E. R. EVANS  1,866,884

BRAKE

Filed Sept. 14, 1925  2 Sheets-Sheet 2

INVENTOR.
EDWIN R. EVANS
BY
Whittemore Hulbert Whittemore
Belknap  ATTORNEYS

Patented July 12, 1932

1,866,884

UNITED STATES PATENT OFFICE

EDWIN R. EVANS, OF DETROIT, MICHIGAN

BRAKE

Application filed September 14, 1925. Serial No. 56,366.

The invention relates to brakes and refers more particularly to brakes employed in connection with the ground wheels of motor vehicles.

One of the objects of my invention is to provide a novel brake construction and method of manufacturing the same, some of the features being simplicity of design, ease of manufacture, and centralization of parts.

A further feature of my invention resides in a novel brake shoe actuating mechanism and method of manufacturing the same. The invention also provides a novel brake shoe anchoring means.

With these and other objects in view, the invention resides in the novel features of construction and combination and arrangements of parts as more fully hereinafter described and claimed.

Referring to the drawings in which like reference characters indicate corresponding parts:

Figure 1 is an elevation view in section showing my invention applied to a steering ground wheel of a motor vehicle;

Figure 2 is a detail elevation view of the brake drum and braking mechanism;

Figure 4:
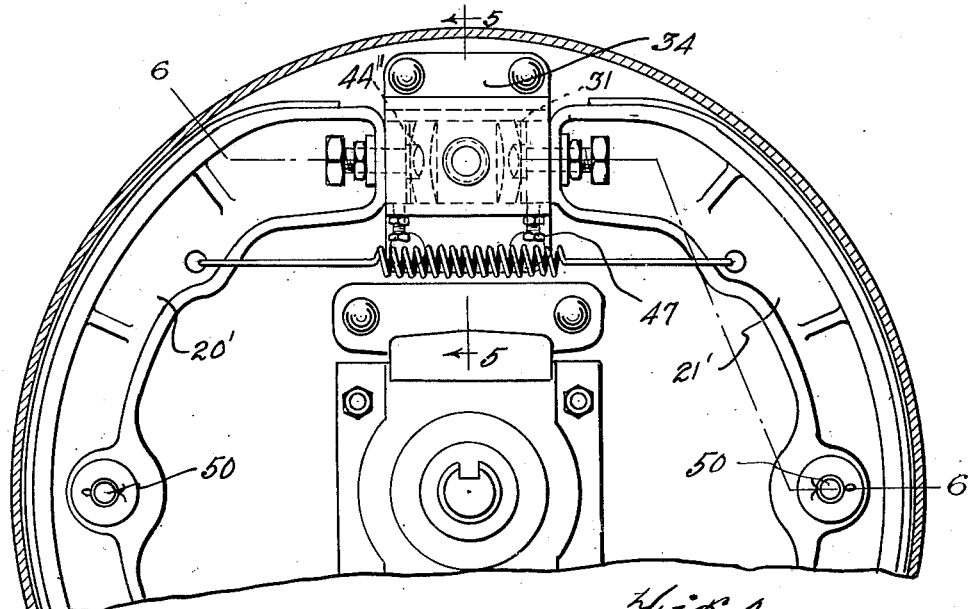
Figure 4 is a fragmentary view corresponding to Figure 2 but illustrating a modified construction.

In the drawings reference character 10 indicates one of the ground wheels of a motor vehicle, a steering wheel being shown for purpose of illustration. It should be understood, however, that the features of my invention are equally adapted for use in connection with either the rear driving wheels or the steering wheels. 11 indicates the front axle which, in accordance with common practice, is provided with a terminal bearing 12 adapted to receive the swivel pin 13. The wheel 10 is rotatable on the spindle 14, the latter being provided with the upper and lower bearings 15 and 16, which swivelly mount the wheel on the pin 13. 17 is the usual steering arm for imparting a steering movement to the wheel. The parts as thus far described may be of the usual or other preferred construction.

18 indicates the brake drum rotatable with the wheel 10. For closing the inner portion of the drum and also for providing an anchorage for the brake shoes 20 and 21, I have provided a plate 19 which is suitably mounted, preferably by attachment, to the bearings 15 and 16 so as to swivel as a unit with the wheel. The brake shoes 20 and 21 are preferably formed from a single piece of stock and one of the features of my invention resides in the provision of a novel method of forming the shoes from the single piece of material. To this end the latter is drilled to provide an opening 22 radially of the brake drum. This opening is then bushed with a hardened sleeve 23 and a cam shaft opening 24 is formed to receive the cam shaft described hereinafter. The stock is then slotted or cut by suitable means through the drilled bore as indicated at 25, thus forming the two shoes 20 and 21, the adjacent ends of which will thus be formed in relatively overlapping relation as shown in Figure 2. 26 is the operating cam shaft which is preferably in the nature of a straight rod with the terminal ball-shaped ends 27 and 28 preferably forged thereon.

In operation of the parts as thus far described, the cam shaft 26 is given a rotative movement through the usual brake pedal (not shown) whereby the ball ends 27 and 28 act to expand the brake shoes 20 and 21 into braking engagement with the drum 18. 29 and 30 are springs for returning the shoes to a non-braking position upon release of a braking force on the cam shaft.

Adjustment and anchorage of the brake shoes is obtained by means of a nut or wedge 31 which is preferably formed with the tapering sides 32, these sides having a sliding engagement with the adjacent terminal ends of the brake shoes 20 and 21. For this purpose the ends of the brake shoes are preferably tapered as shown at 33 to correspond with the tapering slides of the nut. 34 represents a bracket secured at its upper and lower portions to the plate 19 as by the rivets 35, this bracket having upper and lower flattened sides or walls 36 and 37 respectively, and front wall 38. The nut 31 is mounted to slide between the walls 36 and 37 of this bracket, these walls together with the front wall 38 further serving to pivotally receive and form a housing for the ends of the brake shoes 20 and 21. For causing a sliding movement of the nut 31 to adjust the brakes 20 and 21 I have provided a screw 39 having ball sockets 40 adapted to be selectively engaged by a spring pressed ball 41 whereby the screw is adjustably held in its various positions of rotative adjustment. 42 represents a hex terminally formed on the screw 39 for imparting a rotative movement thereto. The opposite end of the screw has a bearing 43 in the front wall 38 of the bracket 34. The screw 39 as shown in the drawings is threaded whereby the nut 31 is given a sliding movement as will be readily understood.

The upper adjacent ends of the shoes 20 and 21 are supported in approximate alignment by the walls 36 and 37, but preferably have a small amount of clearance to permit a rocking action under the influence of the operating cam shaft 26. To this end the tapered sides 32 of the nut 31 are preferably slightly curved as indicated at 44 whereby a rocking movement of the brake shoe ends is permitted.

Figure 6:
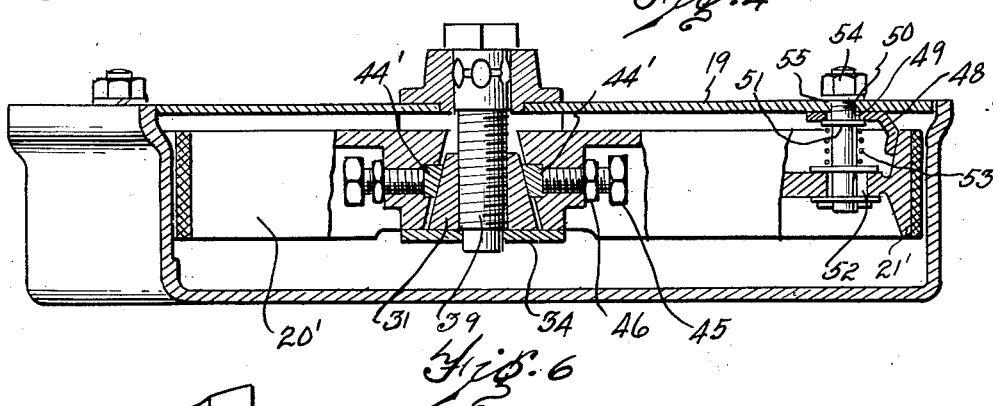
Figure 6 is a sectional plan view along the line 6—6 of Figure 4.
Figures 3, 5:
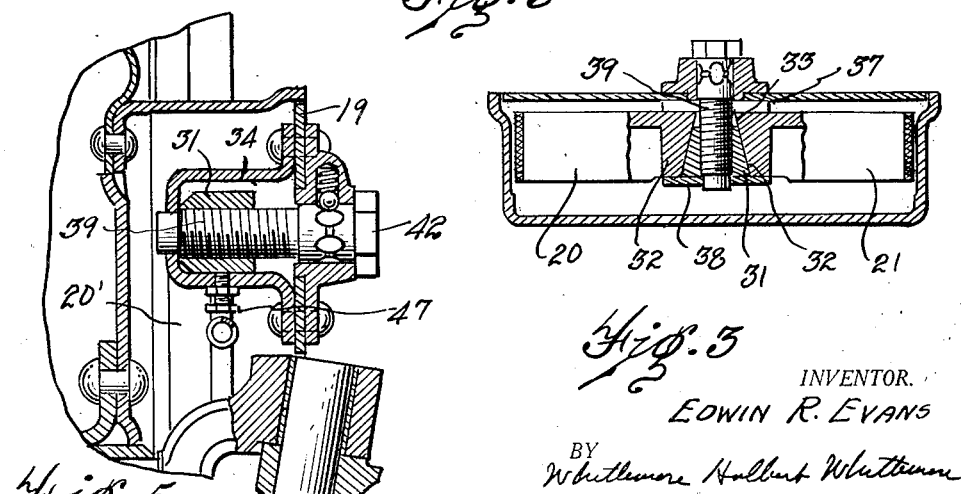
Figure 3 is a sectional plan view along 3—3 of Figure 2.
Figure 5 is a sectional view along 5—5 of Figure 4.

In order to facilitate the assembly of my brake I have illustrated a modified construction in Figures 4, 5 and 6. The brake shoes illustrated in these figures are provided with an adjustable anchorage means whereby exact location of the bracket 34 is not necessary to insure concentricity of the brake shoes with the brake drum. In this construction the upper ends of the brake shoes 20' and 21' do not contact directly with the nut 31 but rather through the contact members 44' carried by the brake shoe ends respectively, and horizontally adjustable by reason of the screws 45 held in adjusted positions by lock nuts 46. For moving the shoes vertically I have provided the screws 47 threaded through the bottom wall of the bracket 34 for contact with the respective ends of the brake shoes.

The brake shoes 20' and 21' are further preferably provided with the adjustable stops 48, longitudinally slotted at 49 for receiving the stud 50. 51 is a collar cammed by the stud for locking contact with the stop 48. Relative movement between the brake shoes and the studs, as in operating the brakes within the limits afforded by the brake drum and the stops 48, is afforded by the slots 52 in the shoes, the spring 53 yieldingly holding the brake shoes properly spaced laterally from the plate 19. A nut 54 and lock washer 55 serve to lock the parts in adjusted position.

Thus in assembling the shoes the bracket 34 may be riveted to the plate 19 in its approximate proper position avoiding accurately locating the same. By reason of the screws 45 and 47 the brake shoes 20' and 21' may then be properly adjusted to their proper positions and the stops 48 then clamped to provide the desired limiting movement of the shoes away from the brake drum.

While it is believed from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. A vehicle brake comprising in combination with a brake drum and a pair of brake shoes adapted to be moved into engagement with the drum, a fixed bracket formed with upper, lower and front walls, a nut provided with tapering sides and mounted to slide between the said upper and lower walls of the bracket, each of said brake shoes having an end mounted between the said upper and lower walls of the bracket, and means in engagement with the said tapering sides of the nut for providing adjustment of the brake shoes, and means for adjustably sliding the nut.

2. A vehicle brake comprising in combination with a brake drum and a pair of brake shoes adapted to be moved into engagement with the drum, a fixed bracket, a member slidable within the bracket and engageable with one of said brake shoes for adjusting the same, said bracket forming a housing for the said adjusting member and also receiving the adjacent ends of said pair of brake shoes, and means for controlling the movement of said member.

3. A vehicle brake comprising in combination with a brake drum and a pair of brake shoes adapted to be moved into engagement with the drum, a fixed bracket, a nut engageable with the adjacent ends of said brake shoes, said bracket forming a housing for said nut, and pivotally receiving said brake shoe ends, and means controlling the movement of said nut.

4. A vehicle brake comprising in combination with a brake drum and a pair of brake shoes adapted to be moved into engagement with the drum, a screw, a nut operatively engageable with said screw for adjusting said brake shoes and a single member housing said screw and nut, said member also forming a bearing for the screw and the adjacent ends of the brake shoes.

5. A vehicle brake comprising in combination with a brake drum and a pair of brake shoes adapted to be moved into engagement with the drum, one of said shoes having a tapered end, a bracket adapted to receive the adjacent ends of said brake shoes, a screw, and a nut operable on said screw and having a tapered portion engageable with the tapered end of said brake shoe for adjusting the same.

6. A vehicle brake comprising in combination with a brake drum and a pair of brake shoes adapted to be moved into engagement with the drum, one of said shoes having a tapered end, a bracket adapted to receive the adjacent ends of said brake shoes, a screw, and a nut operable on said screw and having a tapered portion engageable with the tapered end of said brake shoe for adjusting the same, said screw having a bearing in said bracket.

7. A vehicle brake comprising in the combination with a brake drum and a brake shoe member adapted to be moved into engagement with the drum, an interiorly threaded member movably engaging one end of the said member for adjusting the same, and means for moving said interiorly threaded member, the end of said shoe member having a rocking contact with the said interiorly threaded member, one of said members having a curved face facilitating the rocking of the shoe member.

8. A vehicle brake comprising in combination with a brake drum and a pair of brake shoes adapted to be moved into engagement with the drum, a bracket fixed with respect to the drum and formed with upper, lower and front walls, a nut provided with tapering sides and mounted to slide between the said upper and lower walls of the bracket, each of said brake shoes having an end mounted between the said upper and lower walls of the bracket, said shoe ends being tapered for engagement with the said tapering sides of the nut, a screw threadedly engaging said nut and having a bearing in said front wall of the bracket, and means for controlling a rotative movement of the screw adapted upon rotation thereof to move the nut for adjustment of the said brake shoes.

9. A vehicle brake comprising in combination with a brake drum and a pair of brake shoes adapted to be moved into engagement with said drum, a bracket pivotally housing one end of each of said shoes, adjustable means for positioning the shoes with respect to the bracket, and other means for adjusting said shoes circumferentially.

10. A vehicle brake comprising in combination with a brake drum and a pair of brake shoes adapted to be moved into engagement with said drum, a bracket pivotally housing one end of each of said shoes and adjustable means for positioning the shoes with respect to the bracket in two directions at right angles with each other.

11. A vehicle brake comprising in combination with a brake drum and a pair of brake shoes adapted to be moved into engagement with said drum, a bracket pivotally housing one end of each of said shoes, a wedge carried by the bracket, means for moving said wedge for adjusting said shoes circumferentially, and means for adjustably mounting said shoe ends with respect to said bracket.

12. A vehicle brake comprising in combination with a brake drum and a pair of brake shoes adapted to be moved into engagement with said drum, a bracket pivotally housing one end of each of said shoes, adjustable means for positioning the shoes with respect to the bracket, other means for adjusting said shoes circumferentially, and stops for limiting the movement of said shoes away from said drum, said stops being adjustable to cooperate with the aforesaid adjusting means for properly centering the brake shoes with respect to the drum.

13. A vehicle brake comprising in combination with a brake drum and a pair of brake shoes adapted to be moved into engagement with said drum, a bracket pivotally housing one end of each of said shoes, adjustable means for positioning the shoes with respect to the bracket in two directions at right angles with each other, and stops for limiting the movement of said shoes away from said drum, said stops being adjustable to cooperate with the aforesaid positions means for properly centering the brake shoes with respect to the drum.

14. A vehicle brake comprising in combination an anchoring plate, a brake drum, a pair of brake shoes adapted to be moved into engagement with the drum, a wedge member adapted to make substantially line contact with the ends of the brake shoes, and means in threaded engagement with the wedge member and supported by the anchoring plate for adjusting the wedge members, said means being extended upon the opposite side of the anchoring plate from the brake shoes.

15. A vehicle brake, comprising in combination with a brake drum, brake elements adapted to engage the drum and to be adjusted with respect to each other, an adjustment assembly comprising a member having a threaded portion extending within the drum, detents formed on said member and a braking element associated with said detents for indicating and maintaining the adjustment.

16. A vehicle brake, comprising in combination with a brake drum, internal expanding brake elements adapted to engage the drum and to be adjusted with respect to each other, an adjustment assembly comprising a member having a threaded portion extending within the drum, detents formed on said member, and resilient means associated with said detents for indicating and maintaining the adjustment.

17. A vehicle brake, comprising in combination with a brake drum, a brake element adapted to be moved into engagement with said drum, a screw threaded element, an internally threaded member located within the drum engaging the screw threads and said braking element for adjusting the element into engagement with and away from the drum, and resilient detent means for indicating said adjustment.

18. A vehicle brake, a comprising in combination with a brake drum, a brake element adapted to be moved into engagement with said drum, a screw threaded element, an internally threaded member located within the drum engaging the screw threads and said braking element for adjusting the element into engagement with and away from the drum, detents on the screw threaded element, and resilient means engaging said detents for indicating and maintaining said adjustment.

19. A vehicle brake, comprising in combination with a brake drum, a brake element adapted to be moved into engagement with said drum, a screw threaded bolt, an internally threaded member located within the drum engaging the threaded portion of the bolt and engaging said braking element for adjusting the element into and out of engagement with the drum, detents formed on the head of the bolt, and resilient detent engaging means engaging the detents to indicate and maintain adjustment.

20. A vehicle brake, comprising in combination with a brake drum, a brake element adapted to be moved into engagement with said drum, a screw threaded bolt, an internally threaded member located within the drum engaging the threaded portion of the bolt and engaging said braking element for adjusting the element into and out of engagement with the drum, detents formed on the head of the bolt externally of the drum, and spring-pressed balls engaging said detents to indicate and maintain adjustment.

21. A vehicle brake, comprising in combination with an axle, a wheel, a brake drum carried by the wheel, a pair of brake shoes adapted to be moved into engagement with said drum, adjustable means for moving the shoes substantially radially with respect to the axle, and means for moving both shoes while assembled in the drum in uniform direction making an angle with the substantially radial direction.

22. A vehicle brake, comprising in combination with an axle, a wheel, a brake drum carried by the wheel, a pair of brake shoes adapted to be moved into engagement with said drum, adjustable means for moving the shoes substantially radially with respect to the axle, and means for moving both shoes while assembled in the drum selectively in uniform direction or in opposite directions making an angle with the substantially radial direction.

23. A vehicle brake, comprising in combination an anchoring plate, a brake drum, a pair of brake shoes adapted to be moved into engagement with the drum, a wedge member adapted to make substantially line contact with the ends of the brake shoes, and threaded means engaging the wedge member and supported by the anchoring plate for adjusting the wedge member.

24. A vehicle brake comprising, in combination with a brake drum and a pair of brake shoes adapted to be moved into engagement with the brake drum, a bracket fixed with respect to the drum provided with lateral openings adapted to receive the ends of the brake shoes, a member guided for slidable adjustable movement by said bracket having inclined surfaces for engaging the ends of the brake shoes to adjust the spacing of the shoes with respect to the drum, and means for adjustably sliding said member.

25. A vehicle brake, comprising in combination with a brake drum and a pair of shoes adapted to be moved into engagement with the drum, a backing plate, a bracket secured to the backing plate, anchorage means supported in said bracket and backing plate, the bracket having lateral openings adapted to receive the ends of the brake shoes, the anchorage means being adjustable and having inclined surfaces for engaging the ends of the brake shoes to adjust the spacing of the shoes with respect to the drum.

26. A vehicle brake, comprising in combination with a brake drum, a brake element adapted to be moved into engagement with said drum, a screw threaded bolt accessible for adjustment without removal of the wheel, an internally threaded member located within the drum engaging the threaded portion of the bolt and engaging said braking element for adjusting the element into and out of engagement with the drum, detents formed on the head of the bolt, and resilient detent engaging means engaging the detents to indicate and maintain adjustment.

27. In combination with a rotatable brake drum, a fixed backing plate, a pair of brake shoes adapted to be expanded into engagement with said brake drum, said shoes having oppositely tapered ends, a housing rigid with said backing plate adapted to laterally receive the tapered ends of said brake shoes, a wedge-shaped member engaging the tapered ends of said shoes for adjusting said shoes towards or away from said brake drum, screw-threaded means for moving said wedge-shaped member and means for indicating and maintaining the adjustment thereof.

28. In combination with a rotatable brake drum, a fixed backing plate, a pair of brake shoes adapted to be expanded into engagement with said brake drum, a housing fixed with respect to said backing plate adapted to laterally receive adjacent ends of said brake shoes, said shoe ends being tapered, a wedge member slidable within said housing between said tapered ends in a direction to move said shoes towards or away from the brake drum, a rotatable adjusting member for moving said wedge accessible for adjustment from the exterior of said backing plate and means engaging said member for indicating and maintaining the adjustment thereof.

29. In combination with a rotatable brake drum, a fixed backing plate, a pair of brake shoes adapted to be expanded into engagement with said brake drum, a bracket secured to the inner side of said backing plate, said bracket forming a housing to receive adjacent ends of said brake shoes, said shoe ends being tapered, a wedge member slidable within said housing between said tapered ends in a direction to move said shoes towards or away from said brake drum, a rotatable adjusting member threaded to said wedge and accessible for adjustment from the exterior of said backing plate and means engaging said adjusting member for indicating and maintaining the adjustment thereof.

30. In combination with a rotatable brake drum, a fixed backing plate, a pair of brake shoes adapted to be expanded into engagement with said brake drum, a bracket secured to the inner side of said backing plate, said bracket forming a housing to receive adjacent ends of said brake shoes, a bearing housing rigid with and outwardly extending from said backing plate and adjustable means engaging the ends of said brake shoes within said bracket for moving said shoes towards and away from said brake drum, said adjusting means being supported on either side of said brake shoes by said bracket housing and by said bearing housing.

In testimony whereof I affix my signature.

EDWIN R. EVANS.